(12) United States Patent
Cosentino et al.

(10) Patent No.: US 12,216,535 B2
(45) Date of Patent: Feb. 4, 2025

(54) PROACTIVE INTEGRITY CHECKS

(71) Applicant: Red Hat, Inc., Raleigh, NC (US)

(72) Inventors: Andrea Cosentino, Rome (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 86 days.

(21) Appl. No.: 17/874,138

(22) Filed: Jul. 26, 2022

(65) Prior Publication Data

US 2024/0036971 A1     Feb. 1, 2024

(51) Int. Cl.
| | | |
|---|---|---|
| G06F 11/10 | (2006.01) | |
| G06F 8/20 | (2018.01) | |
| H04L 9/06 | (2006.01) | |

(52) U.S. Cl.
CPC ............ G06F 11/1004 (2013.01); G06F 8/24 (2013.01); H04L 9/0643 (2013.01)

(58) Field of Classification Search
None
See application file for complete search history.

(56) References Cited

U.S. PATENT DOCUMENTS

| | | | |
|---|---|---|---|
| 8,464,222 B2 | 6/2013 | Bell et al. | |
| 9,389,851 B1 | 7/2016 | Nelson et al. | |
| 10,095,511 B1 | 10/2018 | Sengupta et al. | |
| 2004/0199809 A1* | 10/2004 | Hanam | H04L 1/0061 |
| | | | 714/E11.04 |
| 2008/0104573 A1 | 5/2008 | Singla et al. | |
| 2011/0239195 A1 | 9/2011 | Lin et al. | |
| 2019/0129712 A1 | 5/2019 | Hawrylo et al. | |
| 2020/0084264 A1* | 3/2020 | Staubly | G06F 9/54 |

FOREIGN PATENT DOCUMENTS

CN     111475422 A     7/2020

OTHER PUBLICATIONS

"Apache_Maven"—"Apache Maven Clean Plugin—Introduction"-(Apr. 9, 2018) (Year: 2018).*
"Apache_Maven"—"Apache Maven Deploy Plugin"-(Sep. 3, 2018) (Year: 2018).*
"Apache_Maven"—"Developers Center—Testing Plugins Strategies"-(Feb. 8, 2019) (Year: 2019).*
"Apache_Maven"—"Introduction to Repositories"-(Mar. 14, 2021) (Year: 2021).*
"Apache_Maven"—"Shutdown of Forked JVM"-(Apr. 8, 2017) (Year: 2017).*

(Continued)

*Primary Examiner* — April Y Blair
*Assistant Examiner* — Matthew W Wahlin
(74) *Attorney, Agent, or Firm* — Womble Bond Dickinson (US) LLP (57) ABSTRACT

A request to validate a project object model (POM) is received from a client device. The POM references one or more modules, each of which is associated with one or more artifacts. The artifacts associated with a module are downloaded to a staging repository along with checksums of the artifacts. The downloaded checksum is compared to a checksum calculated on the staging repository. Upon determining that the downloaded checksum matches the calculated checksum for all artifacts of all modules, the POM is moved to the staging repository.

20 Claims, 5 Drawing Sheets

(56) References Cited

OTHER PUBLICATIONS

"Apache_Maven"_"Introduction to the POM"-(Feb. 1, 2021) (Year: 2021).*
"Apache_Maven"-"Maven_Artifact_Resolver-About_Checksums"-(Apr. 14, 2022) (Year: 2022).*
Huang, Mincong. "Speed Up The Maven Build" blog post located on the Internet at: https://mincong.io/2018/11/01/speed-up-the-maven-build/ (Nov. 1, 2018), 8 pages.

* cited by examiner

FIG. 1

```
<project>
<projectName>MyProject</projectName>
<module>
   <moduleName>A</moduleName>
      <artifactID>foo</artifactID>
      <artifactIID>bar</artifactID>
</module>
<module>
   <moduleName>B</moduleName>
      <artifactID>ack</artifactID>
</module>
</project>
```
210

FIG. 2A

```
Project MyProject begun
Module A begun
Artifact foo downloaded
Artifact bar downloaded
Module A completed
Module B begun
Artifact ack downloaded
Module B completed
Project MyProject completed
```
220

PROACTIVE INTEGRITY CHECKS

TECHNICAL FIELD

Aspects of the present disclosure relate to proactive integrity checks, and more particularly, to implementing proactive integrity checks during the release of artifacts to a staging repository in anticipation of release to a public repository.

BACKGROUND

Software release processing can involve the deployment of large, complex applications. This deployment can include copying files to a staging repository. The staging repository can allow evaluation of a candidate release prior to production. These files can be organized as a collection of artifacts within one or more modules.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

In modern release processing, artifacts maintained in repositories may be published to a staging repository. In an example, artifacts are computer files. Publishing the artifacts can allow them to be evaluated before promoting them to a new stage, e.g., releasing them to a public repository. This evaluation may include feature evaluation, release integrity, and an examination of the overall integrity of the artifacts.

For example, an Apache Software Foundation (ASF) release workflow can include a 48 to 72-hour voting period after artifacts have been published to a staging repository.

In some release processing, for complex projects, some artifacts (organized in a collection known as a module) may fail to be correctly published to a staging repository. In some examples, this can be a Nexus repository. The resulting errors can be silent and can result in an inconsistent release state. This inconsistent result state can be difficult to identify because of the cardinality of the artifacts involved in the process. Errors not identified during staging risk propagation to production resulting in a broken release.

As the number of staging environments supported by some release processing increases, the computing bandwidth that is used to publish each release also increases. For example, some release processing may include hundreds or thousands of different VMs, containers, or containers residing within VMs. In some release processing, whenever a new staging environment is instantiated, computing bandwidth is consumed to communicate between the new staging environment and each of the hundreds or thousands of other staging environments supported by the release processing architecture.

Dedicating computing bandwidth to release publication, much of which may be incorrectly transmitted, can decrease performance of the release processing architecture as this computing bandwidth may be unavailable to the release processing architecture to perform other operations (e.g., executing correctly configured workloads).

Aspects of the disclosure address the above noted and other deficiencies by introducing an integrity check while the release is being published to the staging repository. If an artifact is missing or improperly published after a release publishes a module, the release can be aborted. In some examples, the staging repository can be automatically deleted. The integrity check can be a process running concurrently with the publication. In some examples, the process is a tool, a Maven module, or a bash script. Other implementations of the integrity check are also contemplated.

Projects based on Maven, Gradle, or Ant can have a tree structure. One aspect of the disclosure addresses a Maven project. Other implementations are contemplated. First, a Maven project can have a list of modules within its project object model (POM). In an example, a tool can scan the POM from its root and collect module names, groupId, artifact names, and versions. It can descend the POM hierarchy and collect the same or similar information for subdirectories. The tool can construct a comprehensive list of the modules of the project, and their respective artifacts, and can store it locally. In an example, the list can be stored as a reactor-module.info file.

In an example, the release process can start when Maven reaches a release perform phase. The tool can obtain a staging repository name and location from a release log associated with the release process. A release process can process a first module, downloading the artifacts related to that module. By examining the list of modules for a project, and the artifacts associated with that module, obtained from the locally stored list, the tool can subsequently examine the release log to determine that all the artifacts associated with that module have been downloaded. In an example, the tool can then obtain an artifact's URL from the release:perform log of the release process and invoke a "curl" command against each artifact. In some embodiments, "curl" is a command line interface that provides the programmatic ability to transfer data using various networking protocols, such as hypertext transfer protocol (HTTP). The curl program is merely an example, and other data transfer programs may be used without deviating from the scope of the present disclosure. The curl command may resemble "curl-IL <URL>." This curl operation may serve to download (e.g., over HTTP) the artifact by using the URL for the artifact. If the curl operation returns a positive HTTP code and provides a result, an integrity check may be performed. In an example, the integrity check may use a hash based on MD5 or SHA512. Other hash algorithms or checksums may be contemplated. In another example, if the curl operation fails to return a positive HTTP code and/or fails to provide a result, the integrity check may be immediately failed. In an example, another curl command, such as "curl-IL<URL>/<artifactName>.jar.sha512" may be executed and the result stored locally. This curl operation may serve to download (e.g., over HTTP) the hash for the artifact by using the URL for the artifact. In an example, the tool can then obtain, from the reactor-module.info file, a path to a local target directory of the locally-constructed artifact and obtain the local <artifactName>.jar.sha512 checksum. For example, obtaining the local checksum may include performing a hash on the downloaded artifact. The locally-constructed and downloaded checksums can then be compared. Upon successful checksum comparison of the artifacts associated with a module, the next module may be processed.

Upon a checksum comparison failure, however, the tool can send a signal (e.g., a SIGKILL) to the running release process, terminating publication of the module being processed. In an example, the entire publication can be stopped. In an example, the staging repository can be deleted. In another example, the tool can report the failure without terminating the publication process and allow human intervention. In some cases, intervention may include stopping the publication process, dropping the staging repository, and restarting the publication process. In another example, intervention may include resuming publication of the affected module without dropping the staging repository.

By detecting publishing failures, extraneous work configured by the processing logic can be reduced. Furthermore, eliminating this extraneous work can reduce the number of needed processing devices and an amount of network bandwidth. Therefore, the computing bandwidth that is consumed by incorrectly copying artifacts is reduced, allowing the computing bandwidth to be used to execute additional workloads or perform other operations, improving the performance of the publication process.

Although aspects of the disclosure may be described in the context of a staging repository, embodiments of the disclosure may be applied to any computing system that configures multiple collections of software components.

Figure 1:
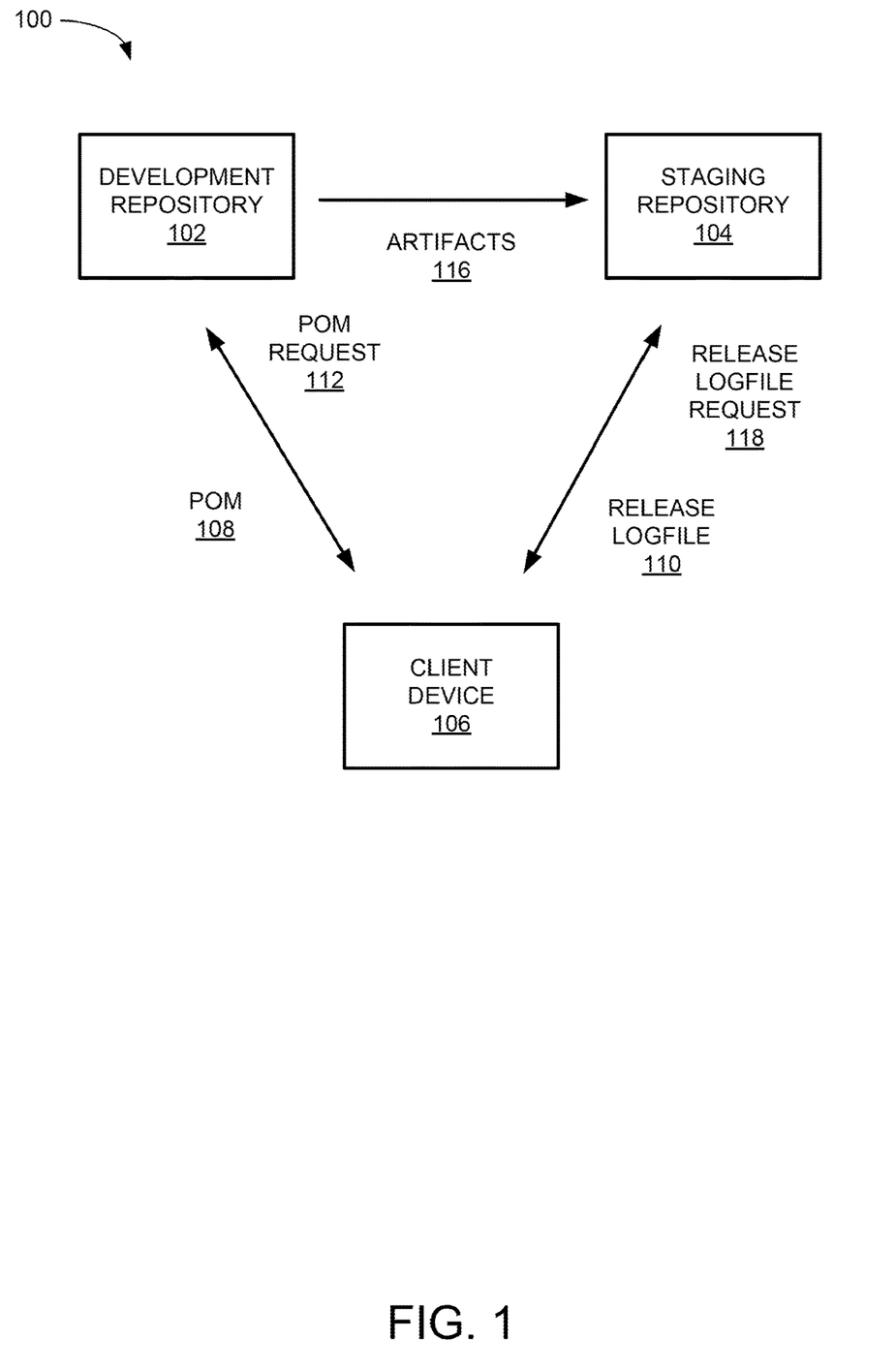
FIG. 1 is an illustration of an example of a client device transmitting a request to validate a collection of artifacts in a deployment architecture, in accordance with embodiments of the disclosure.

FIG. 1 is an illustration of an example of a client device 106 transmitting a request to validate a collection of artifacts in a deployment architecture, in accordance with embodiments of the disclosure. As shown in FIG. 1, development repository 102 and staging repository 104 are accessed by client device 106. In an example, client device 106 requests 112 a POM, e.g., describing a Maven project, from the development repository 102. In some cases, other types of projects may be deployed, and other mechanisms may be used to describe the project. In an example, the client device 106 can parse the POM 108 hierarchy to collect a list of the modules of the project and the files associated with each module. In an example, the list may be stored in a reactor-module.info file. In some cases, the files may be referred to as artifacts. In some examples, development repository 102 and staging repository 104 can reside on the same host. In some cases, the functions performed by client device 106 may be performed by one or another host.

In an example, a release process is initiated that causes one or more artifacts 116 to be downloaded from a development repository 102 to a staging repository 104. In an example, the artifacts 116 are downloaded in module order. In some cases, artifacts associated with a first module are downloaded, followed by artifacts associated with a second module, according to the order in which the module is listed in the POM.

In an example, the client device 106 can issue a request 118 for a release logfile 110 that can be updated as the artifacts 116 are downloaded to the staging repository 104. In some cases, the release logfile 110 can be streamed to the client device 106. In some cases, the client device 106 can periodically issue a request 118 for an updated release logfile 110. In an example, as the release logfile 110 is made available to the client device 106, the client device 106 determines that the artifacts 116 associated with a module have completed downloading to the staging repository 104.

In an example, upon determination by the client device that all the artifacts 116 associated with a particular module have been downloaded to the staging repository 104, the client device can validate that the artifacts 116 associated with the particular module were properly downloaded to the staging repository 104. In an example, the client device can determine, by examining the release logfile 110, that all the artifacts associated with the module have been downloaded. In an example, the client device 106 can wait until all artifacts 116 associated with a module have been downloaded before beginning an integrity check to validate the artifacts 116.

In an example, an artifact integrity check can involve comparing a hash of an artifact, stored in the development repository 102 along with the artifact, with a hash of the downloaded artifact that is calculated after the download. In an example, the location of the downloaded artifact can be found in the previously-created list of the modules of the project and the files associated with each module. In an example, the calculated hash can be calculated on the staging repository 104. In another example, the calculated hash can be calculated on the client device 106. In other examples, the calculated hash can be calculated on any accessible computing device. In some examples, the hash is based on an MD5 algorithm. In other examples, the hash is based on SHA512. Other hashing algorithms are also contemplated.

Figure 2A:
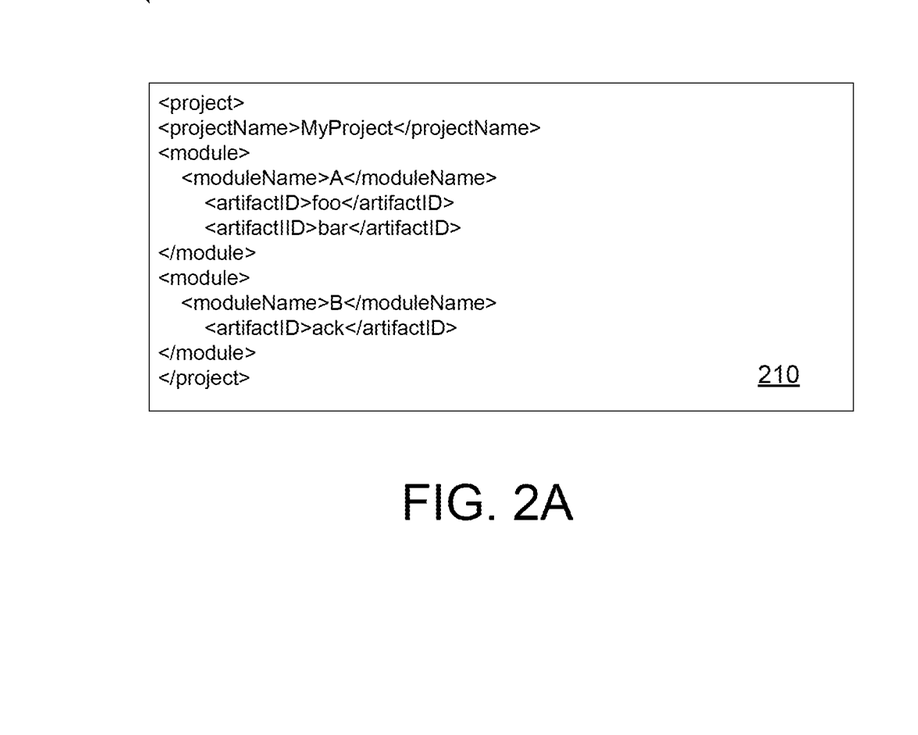
FIG. 2A is an illustration of an example project object model (POM), in accordance with embodiments of the disclosure.
Figure 2B:
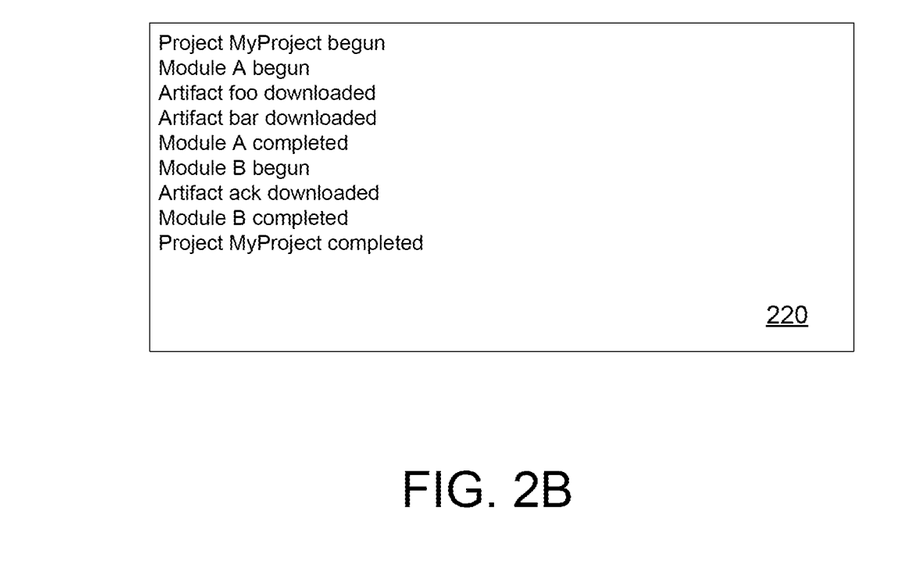
FIG. 2B is an illustration of an example release log associated with the deployment of the POM of FIG. 2A.

FIGS. 2A and 2B are illustrations 200 of an example POM 210 and an example logfile associated with the deployment of the POM. FIG. 2A is an illustration of an example POM 210. POM 210 illustrates a POM for an example project named "MyProject," as defined by "ProjectName." In the example, the project contains two modules, "A" and "B." In the example, a module is introduced with the "<module>" tag and defined with the tag "<moduleName>." In the example, module "A" includes two artifacts, or files, "foo" and "bar." Module "B" includes a single artifact "ack." In the example, an artifact is introduced and named with the "<artifactID>" tag. Additional descriptive information may be included in the POM 210.

FIG. 2B is an illustration of an example release log for a release process including POM 210 as shown in FIG. 2A. The example release log 220 indicates the commencement of the publishing process for "MyProject," the downloading of artifacts "foo" and "bar" for Module "A," and the downloading of artifact "ack" for Module "B." The release log 220 also shows the completion of the release process for "MyProject." In some cases, additional or different log information may be reported.

Figure 3:
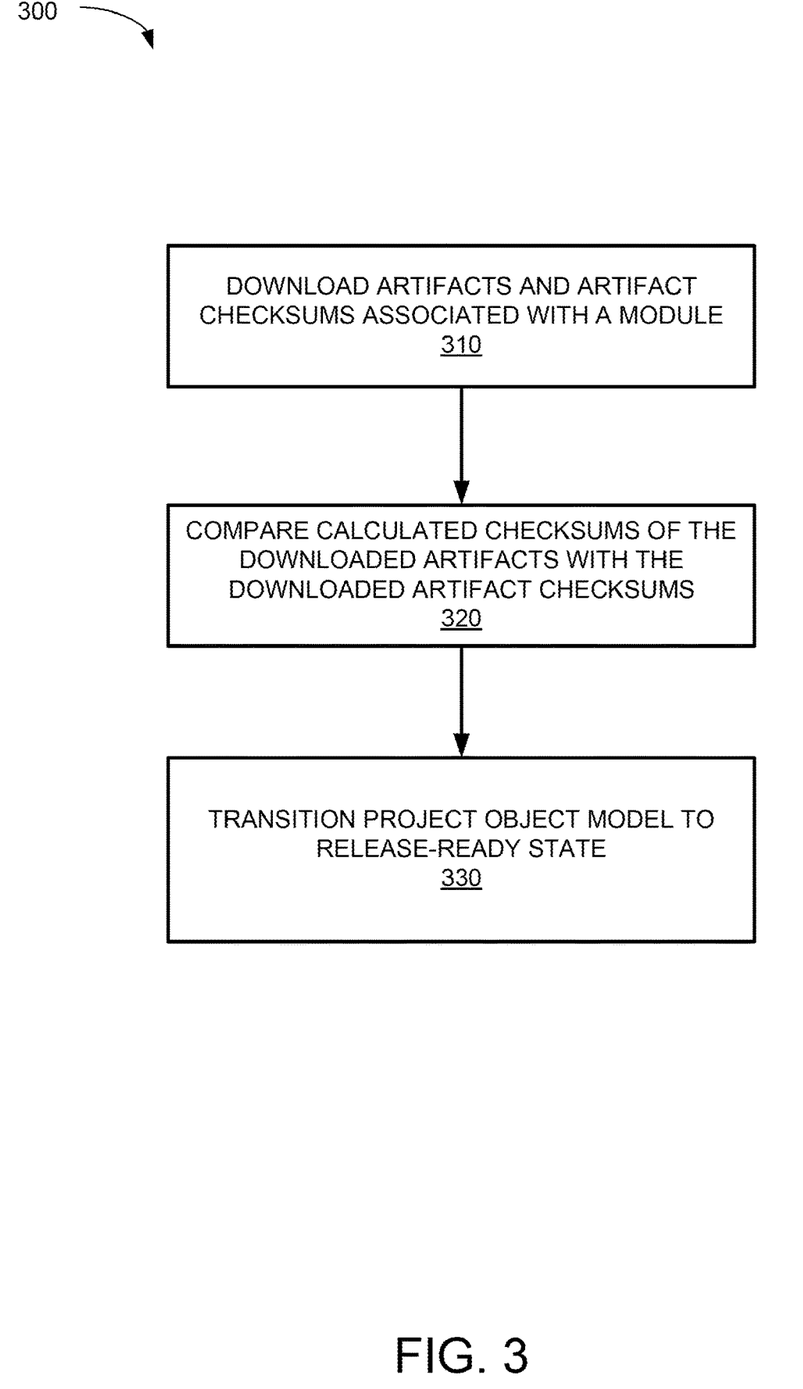
FIG. 3 is a flow diagram of a method of validating a collection of artifacts in a deployment architecture, in accordance with some embodiments.

FIG. 3 is a flow diagram of a method 300 of validating a collection of artifacts in a deployment architecture, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by the components of FIG. 1.

With reference to FIG. 3, method 300 illustrates example functions used by various embodiments. Although specific function blocks ("blocks") are disclosed in method 300, such blocks are examples. That is, examples are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic downloads artifacts and artifact checksums associated with a module. In an example, an artifact can be a file. In an example, an artifact checksum can be the result of a hash function applied against an artifact, such that the same hash function applied against the artifact will consistently return the same value. In an example, the download may include receiving a POM specifying a number of modules, each module associated with a number of artifacts that are to be downloaded to a staging repository. In an example, the POM may be the POM illustrated in FIG. 2A. In an example, the processing logic may detect a completion of downloading of the artifacts and artifact checksums associated with a module. The processing logic may also, upon a determination of a failure to copy an artifact, fail the validation. Such detection may involve scanning a release log such as the log illustrated in FIG. 2B. In an example, the processing logic may detect completion of download of all artifacts and artifact checksums associated with all modules specified in a POM. In another example, the processing logic may perform an independent attempt to copy an artifact from the development repository. In another example, the processing logic may detect completion of the download of an individual artifact and its artifact checksum. In some examples, the processing logic may detect completion of a download of artifacts.

At block 320, the processing logic compares calculated checksums of the downloaded artifacts with the downloaded artifact checksums. In some examples, for each artifact of the module, the processing logic compares a downloaded artifact checksum with a checksum locally calculated on the staging repository. In some cases, the calculated checksum may be calculated on another host system. In some examples, if the comparison fails, the processing logic may cause the POM within the staging repository to be removed. In some cases, this removal may effected by transmitting a command to the supporting host system.

At block 330, the processing logic transitions the POM to a release-ready state. In some examples, the processing logic may condition the transitioning upon a determination that, for the artifacts associated with each module, the calculated checksum of each artifact matches the downloaded checksum for that artifact. In an example, the primary repository and staging repositories may be the development repository 102 and the staging repository 104, respectively, as shown in FIG. 1. In some examples, other actions may be taken upon a successful comparison of the downloaded and calculated checksums.

Figure 4:
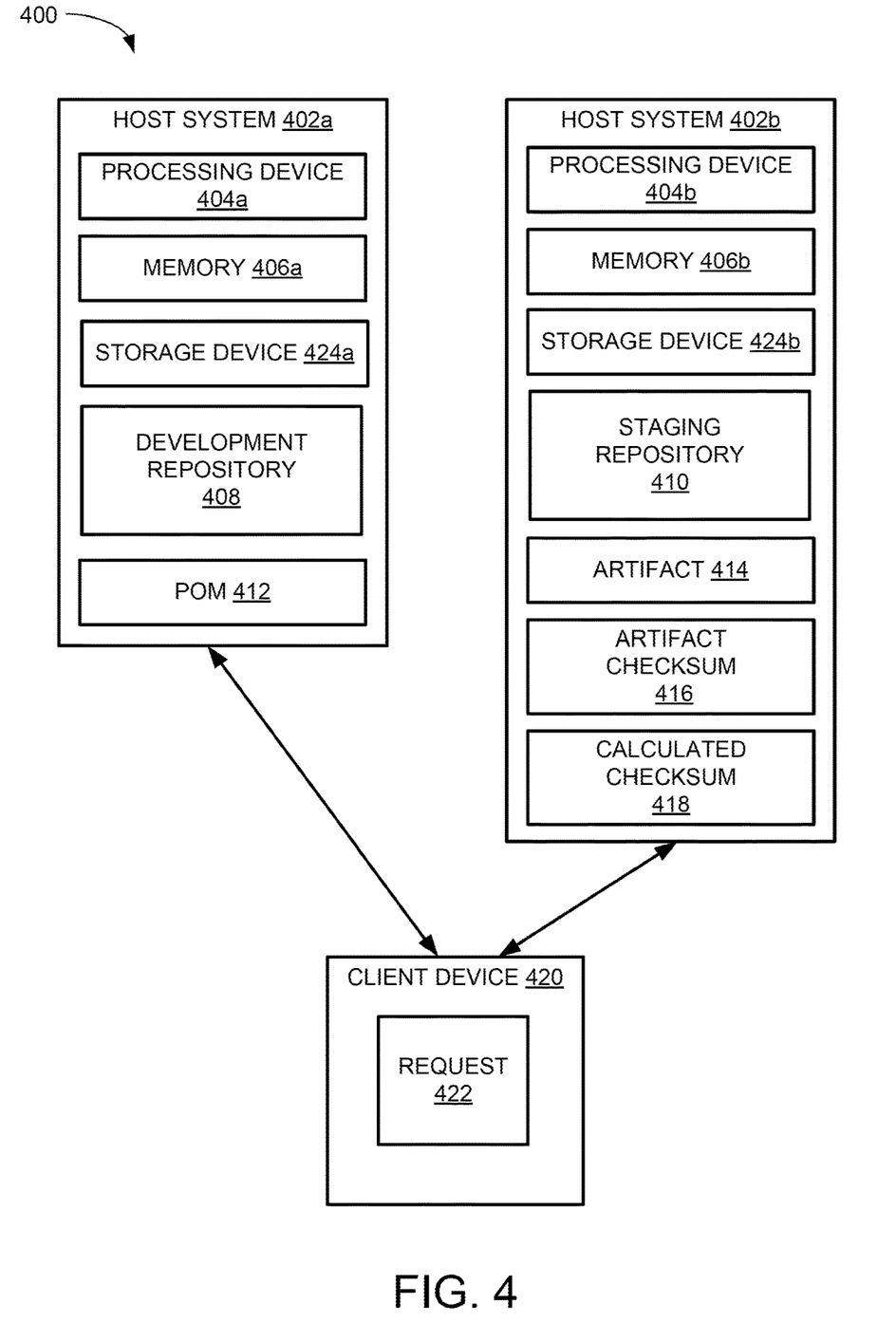
FIG. 4 is a component diagram of an example deployment architecture, in accordance with embodiments of the disclosure.

FIG. 4 is a component diagram of an example deployment architecture 400, in accordance with one or more aspects of the present disclosure. However, other deployment architectures are possible, and the implementation of a computer system utilizing examples of the disclosure are not necessarily limited to the specific architecture depicted by FIG. 4. Host systems 402a and 402b may include processing devices 404a and 404b, respectively. Host systems 402a and 402b may also include memory 406a and 406b respectively. Host systems 402a and 402b may also include storage devices 424a and 424b respectively.

The memory 406a/b may include volatile memory devices, e.g., random-access memory (RAM), non-volatile memory devices, e.g., flash memory, and/or other types of memory devices, and storage devices 424a/b (e.g., one or more magnetic hard disk drives, a Peripheral Component Interconnect [PCI] solid state drive, a Redundant Array of Independent Disks [RAID] system, a network attached storage [NAS] array, etc.). In certain implementations, memory 406a/b may be non-uniform access (NUMA), such that memory access time depends on the memory location relative to processing device 404a/b. It should be noted that although, for simplicity, a single processing device 404a, memory 406a, and storage device 424a are depicted in host system 402a of FIG. 4, other embodiments of host systems 402a/b and client device 420 may include multiple processing devices, storage devices, or devices. Processing device 404a/b and client device 420 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 404a/b and client device 420 may also include one or more special-purpose processing devices such as an application specific integrated circuit (ASIC), a field programmable gate array (FPGA), a digital signal processor (DSP), network processor, or the like.

In an example, host system 402a may support a development repository 408. In an example, host system 402a may include a POM 412. Development repository 408 and POM 412 may correspond to development repository 102 and POM 108, respectively, of FIG. 1. In the example, a client device 420 may include a request 422. Request 422 may correspond to POM request 112 of FIG. 1. In the example, host system 402b may support a staging repository 410. Staging repository 410 may correspond to staging repository 104 of FIG. 1. Host system 402b may further include an artifact 414, an artifact checksum 416, and a calculated checksum 418. Artifact 414 may correspond to artifact 116 of FIG. 1. Calculated checksum 418 may be obtained by applying a hash function against artifact 414.

The host systems 402a and 402b and client device 420 may be a server, a mainframe, a workstation, a personal computer (PC), a mobile phone, a palm-sized computing device, etc. In some examples, host systems 402a and 402b and/or client device 420 may be separate computing devices. In some examples, host systems 402a and 402b and/or client device 420 may be implemented by a single computing device. For clarity, some components of host systems 402a and 402b and/or client device 420 are not shown. Furthermore, although deployment architecture 400 is illustrated as having two host systems, examples of the disclosure may utilize any number of host systems.

It should be noted that development repository 408, POM 412, request 422, staging repository 410, artifact 414, artifact checksum 416, and calculated checksum 418 are shown for illustrative purposes only and are not physical components of host systems 402a or 402b, or client device 420.

Figure 5:
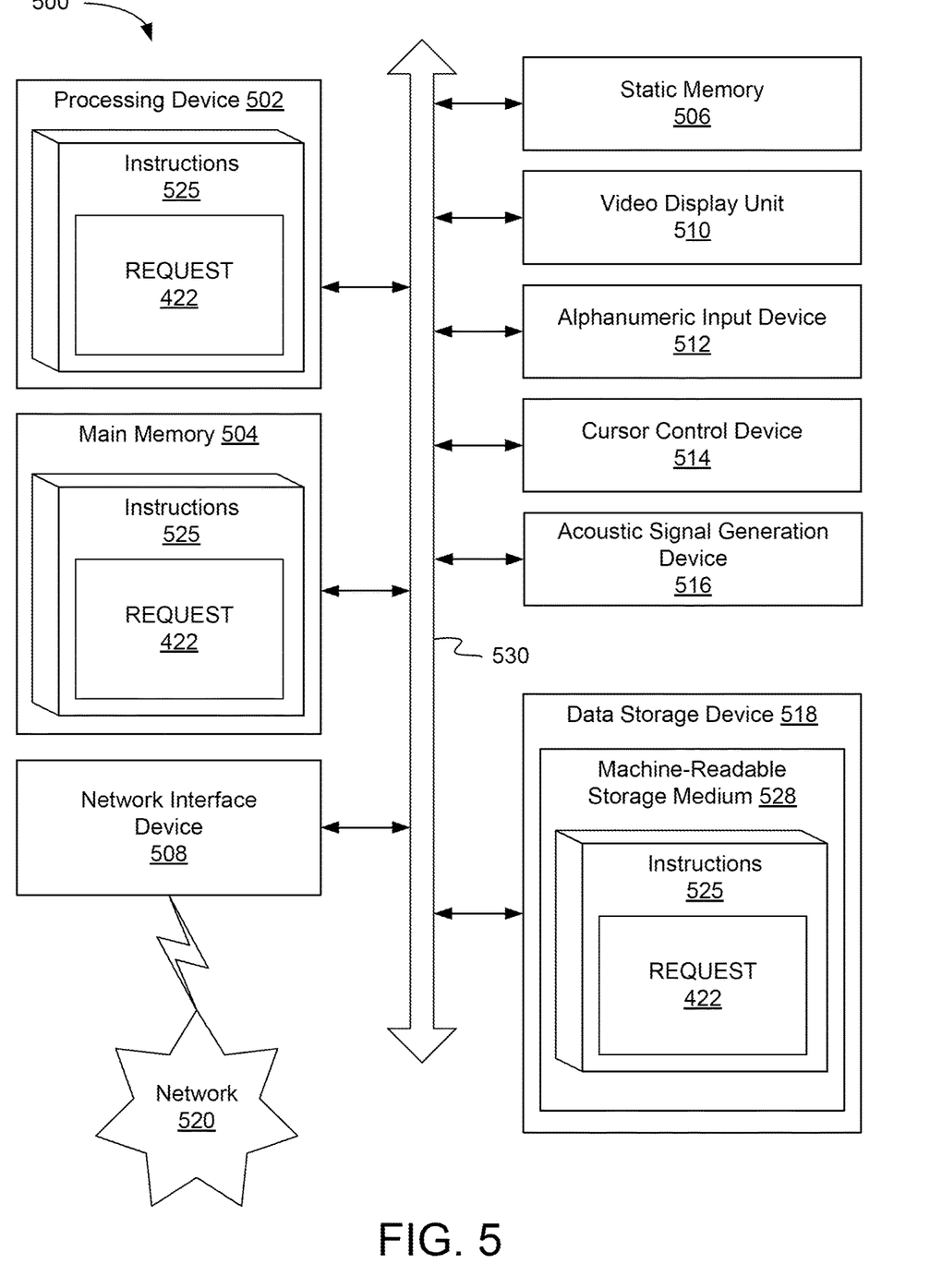
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for an integrity check, e.g., request 422 for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "validating," "receiving," "transmitting," "deleting," "detecting," "terminating," "downloading," "comparing," "generating," "transitioning," "matching," or the like, refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended to not invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of validating a project object model (POM), the POM comprising a plurality of modules, each of the plurality of modules comprising a plurality of artifacts, the method comprising:
retrieving, by a client, a logfile comprising a listing of the plurality of artifacts, the plurality of artifacts associated with the plurality of modules;
for each artifact identified in the listing:
downloading, by the client, to a staging repository, the artifact and an artifact checksum of the artifact to generate a downloaded artifact and a downloaded checksum;
comparing, by a processing device, a calculated checksum of the downloaded artifact with the downloaded checksum, the calculated checksum obtained from other than the client and the staging repository; and
responsive to the calculated checksum not matching the downloaded checksum, downloading, by the client, to the staging repository, a second copy of the artifact and a second artifact checksum of the artifact to generate a second downloaded artifact and a second downloaded checksum; and
responsive to at least one of the calculated checksum matching the downloaded checksum or the calculated checksum matching the second downloaded checksum, for each artifact identified in the listing, transitioning the POM to a release-ready state.

2. The method of claim 1, wherein comparing the calculated checksum of the downloaded artifact with the downloaded checksum is initiated in response to a completion of an artifact download as determined from an entry in a log file.

3. The method of claim 1, wherein the staging repository is a directory.

4. The method of claim 1, wherein the calculated checksum of the downloaded artifact is generated using MD5 or SHA512.

5. The method of claim 1, further comprising terminating the validating responsive to a determination that the calculated checksum of the downloaded artifact fails to match the downloaded checksum of the downloaded artifact.

6. The method of claim 5, further comprising deleting the POM from the staging repository responsive to the determination that the calculated checksum of the downloaded artifact fails to match the downloaded checksum of the downloaded artifact.

7. The method of claim 5, wherein the validating is terminated with a SIGKILL.

8. A system comprising:
a memory; and
a processing device, operatively coupled to the memory, to:
receive a request to validate a plurality of modules, each of the plurality of modules comprising a plurality of artifacts, the request further comprising a project object model (POM), the POM comprising the plurality of modules;
retrieve a logfile comprising a listing of the plurality of artifacts, the plurality of artifacts associated with the plurality of modules;
for each artifact identified in the listing:
cause to be downloaded to a staging repository, the artifact and an artifact checksum associated with the artifact to generate a downloaded artifact and a downloaded checksum;
compare, by the processing device, a calculated checksum of the downloaded artifact with the downloaded checksum, the calculated checksum generated on a second processing device, the second processing device distinct from the processing device;
responsive to the calculated checksum not matching the downloaded checksum, cause to be downloaded to the staging repository, a second copy of the artifact and a second artifact checksum of the artifact to generate a second downloaded artifact and a second downloaded checksum; and
responsive to at least one of the calculated checksum matching the downloaded checksum or the calculated checksum matching the second downloaded checksum, for each artifact identified in the listing, transition the POM to a release-ready state.

9. The system of claim 8, wherein compare the calculated checksum of the downloaded artifact with the downloaded checksum is initiated in response to a completion of an artifact download as determined from an entry in a log file.

10. The system of claim 8, wherein the staging repository is a directory.

11. The system of claim 8, wherein the calculated checksum of the downloaded artifact is generated using MD5 or SHA512.

12. The system of claim 8, wherein the processing device is further to terminate the request upon a determination that the calculated checksum of the downloaded artifact fails to match the downloaded checksum of the downloaded artifact.

13. The system of claim 12, wherein the processing device is further to delete the POM from the staging repository responsive to the determination that the calculated checksum of the downloaded artifact fails to match the downloaded checksum of the downloaded artifact.

14. The system of claim 12, wherein the terminating the request is performed with a SIGKILL.

15. The system of claim 8, wherein a result of the request is provided.

16. The system of claim 8, wherein the processing device is further to:
   detect a failure of the calculated checksum of the downloaded artifact to match the downloaded checksum of the downloaded artifact; and
   terminate validation of the plurality of modules.

17. A non-transitory computer-readable storage medium including instructions for validating a project object model (POM) the POM comprising a plurality of modules, each of the plurality of modules comprising a plurality of artifacts that, when executed by a processing device, cause the processing device to:
   retrieve a logfile comprising a listing of the plurality of artifacts, the plurality of artifacts associated with the plurality of modules;
   for each artifact identified in the listing:
      cause to be downloaded to a staging repository, the artifact and an artifact checksum associated with the artifact to generate a downloaded artifact and a downloaded checksum;
      compare, by the processing device, a calculated checksum of the downloaded artifact with the downloaded checksum, the calculated checksum generated by a second processing device, the second processing device distinct from the processing device; and
      responsive to the calculated checksum not matching the downloaded checksum, cause to be downloaded to the staging repository, a second copy of the artifact and a second artifact checksum of the artifact to generate a second downloaded artifact and a second downloaded checksum; and
   responsive to at least one of the calculated checksum matching the downloaded checksum or the calculated checksum matching the second downloaded checksum, for each artifact identified in the listing, transition the POM to a release-ready state.

18. The non-transitory computer-readable storage medium of claim 17, wherein compare the calculated checksum of the downloaded artifact with the downloaded checksum is initiated in response to a completion of an artifact download as determined from an entry in a log file.

19. The non-transitory computer-readable storage medium of claim 17, wherein the instructions further cause the calculated checksum of the downloaded artifact to be generated using MD5 or SHA512.

20. The non-transitory computer-readable storage medium of claim 17, wherein the instructions further cause the processing device to restart a validation of the POM upon a determination that the calculated checksum of the downloaded artifact fails to match the downloaded checksum of the downloaded artifact.

* * * * *